United States Patent
Kauffman (10) Patent No.: US 8,509,140 B2
(45) Date of Patent: Aug. 13, 2013

(54) SYSTEM AND METHOD FOR TRANSMITTING INFORMATION USING AIRCRAFT AS TRANSMISSION RELAYS

(75) Inventor: Donald C. Kauffman, Laurel, MD (US)

(73) Assignee: Honeywell International Inc., Morristown, NJ (US)

( * ) Notice: Subject to any disclaimer, the term of this patent is extended or adjusted under 35 U.S.C. 154(b) by 1588 days.

(21) Appl. No.: 11/561,977

(22) Filed: Nov. 21, 2006

(65) Prior Publication Data

US 2008/0117858 A1 May 22, 2008

(51) Int. Cl.
*H04B 7/185* (2006.01)
*H04B 7/00* (2006.01)
*H04B 7/15* (2006.01)
*H04L 12/28* (2006.01)
*G06F 15/173* (2006.01)
*H04W 4/04* (2009.01)

(52) U.S. Cl.
USPC ........... 370/316; 370/310; 370/351; 709/238; 455/41.2; 455/431; 455/11.1

(58) Field of Classification Search
USPC ............. 455/41.1–41.3, 11.1, 98, 431, 422.1; 370/310, 316, 338, 328, 351; 709/238
See application file for complete search history.

(56) References Cited

U.S. PATENT DOCUMENTS

| | | | |
|---|---|---|---|
| 4,414,661 A | 11/1983 | Karlstrom | |
| 4,901,307 A | 2/1990 | Gilhousen et al. | |
| 5,530,909 A | 6/1996 | Simon et al. | |
| 5,710,764 A | 1/1998 | Yoshimura et al. | |
| 5,835,059 A | 11/1998 | Nadel et al. | |
| 6,018,659 A | 1/2000 | Ayyagari | |
| 6,047,165 A | 4/2000 | Wright et al. | |
| 6,084,870 A | 7/2000 | Wooten | |
| 6,104,712 A | 8/2000 | Robert et al. | |
| 6,108,539 A | 8/2000 | Ray et al. | |
| 6,147,980 A | 11/2000 | Yee et al. | |
| 6,148,179 A | 11/2000 | Wright | |
| 6,154,636 A | 11/2000 | Wright et al. | |
| 6,160,998 A | 12/2000 | Wright et al. | |
| 6,163,681 A | 12/2000 | Wright et al. | |

(Continued)

FOREIGN PATENT DOCUMENTS

| EP | 1850543 | 10/2007 |
|---|---|---|
| WO | 03053013 | 6/2003 |

(Continued)

OTHER PUBLICATIONS

European Patent Office, "European Search Report", Oct. 31, 2008, Published in: EP.

(Continued)

*Primary Examiner* — Matthew Sams
(74) *Attorney, Agent, or Firm* — Fogg & Powers LLC (57) ABSTRACT

A method of processing a message in a relay network comprises determining if a destination node is within range; if the destination node is not in range, identifying one or more network member aircraft within range; selecting one of the one or more network member aircraft within range; authenticating membership of the selected network member aircraft if membership of the selected network member aircraft has not been previously authenticated; and transmitting the message to the selected network member aircraft in order to relay the message to the destination node at least in part via the selected network member aircraft.

20 Claims, 4 Drawing Sheets

(56) References Cited

U.S. PATENT DOCUMENTS

| | | |
|---|---|---|
| 6,173,230 B1 | 1/2001 | Camus et al. |
| 6,181,990 B1 | 1/2001 | Grabowsky et al. |
| 6,195,189 B1 | 2/2001 | Nishihata et al. |
| 6,259,379 B1 | 7/2001 | Paterson et al. |
| 6,262,659 B1 | 7/2001 | Korkosz et al. |
| 6,285,878 B1 | 9/2001 | Lai |
| 6,308,044 B1 | 10/2001 | Wright et al. |
| 6,353,779 B1 | 3/2002 | Simon et al. |
| 6,438,468 B1 | 8/2002 | Muxlow et al. |
| 6,477,152 B1 | 11/2002 | Hiett |
| 6,606,055 B2 | 8/2003 | Halsema et al. |
| 6,643,274 B2 | 11/2003 | D'Annunzio |
| 6,677,888 B2 | 1/2004 | Roy |
| 6,744,396 B2 | 6/2004 | Stone et al. |
| 6,778,825 B2 | 8/2004 | Parkman |
| 6,781,513 B1 | 8/2004 | Korkosz et al. |
| 6,788,935 B1 | 9/2004 | McKenna et al. |
| 6,795,408 B1 | 9/2004 | Hiett |
| 6,816,728 B2 | 11/2004 | Igloi et al. |
| 6,915,189 B2 | 7/2005 | Igloi et al. |
| 6,940,832 B2 | 9/2005 | Saadawi et al. |
| 6,965,816 B2 | 11/2005 | Walker |
| 6,970,444 B2 | 11/2005 | Chwieseni et al. |
| 6,990,319 B2 | 1/2006 | Wright et al. |
| 7,027,812 B2 | 4/2006 | Dastrup et al. |
| 7,072,977 B1 * | 7/2006 | Bernard et al. ............... 709/238 |
| 7,085,562 B1 | 8/2006 | Holder et al. |
| 7,116,266 B1 | 10/2006 | Vesel et al. |
| 7,177,939 B2 | 2/2007 | Nelson et al. |
| 7,181,160 B2 | 2/2007 | Barrett |
| 7,519,014 B2 | 4/2009 | Allen et al. |
| 2002/0009993 A1 | 1/2002 | Dastrup et al. |
| 2002/0168971 A1 | 11/2002 | Parkman |
| 2002/0191573 A1 | 12/2002 | Whitehill et al. |
| 2003/0003872 A1 | 1/2003 | Brinkley et al. |
| 2003/0073406 A1 * | 4/2003 | Benjamin et al. ............... 455/41 |
| 2003/0231574 A1 | 12/2003 | Okuda et al. |
| 2004/0028003 A1 | 2/2004 | Diener et al. |
| 2004/0235469 A1 | 11/2004 | Krug |
| 2005/0026609 A1 | 2/2005 | Brinkley et al. |
| 2005/0053026 A1 | 3/2005 | Mullan et al. |
| 2005/0054346 A1 | 3/2005 | Windham et al. |
| 2005/0064895 A1 | 3/2005 | Oesterling et al. |
| 2005/0090201 A1 | 4/2005 | Lengies et al. |
| 2005/0108374 A1 | 5/2005 | Pierzga et al. |
| 2005/0143013 A1 | 6/2005 | Jha |
| 2005/0174950 A1 | 8/2005 | Ayyagari |
| 2005/0197748 A1 | 9/2005 | Holst et al. |
| 2005/0220055 A1 | 10/2005 | Nelson et al. |
| 2005/0221814 A1 | 10/2005 | Fagan et al. |
| 2005/0221818 A1 | 10/2005 | Johnson et al. |
| 2005/0232185 A1 | 10/2005 | Hudson et al. |
| 2005/0286452 A1 | 12/2005 | Hardgrave et al. |
| 2006/0023677 A1 | 2/2006 | Labrador et al. |
| 2006/0031394 A1 | 2/2006 | Tazuma |
| 2006/0080451 A1 | 4/2006 | Eckert |
| 2006/0098608 A1 | 5/2006 | Joshi |
| 2006/0176842 A1 | 8/2006 | Tamura |
| 2006/0178141 A1 | 8/2006 | McGuffin et al. |
| 2007/0042773 A1 | 2/2007 | Alcorn |
| 2007/0042774 A1 | 2/2007 | Alcorn |
| 2007/0072590 A1 | 3/2007 | Levitan |
| 2007/0150939 A1 * | 6/2007 | Aaron et al. ..................... 726/3 |
| 2007/0183435 A1 | 8/2007 | Kettering et al. |
| 2008/0144617 A1 | 6/2008 | Molsberry et al. |
| 2008/0205283 A1 | 8/2008 | McGuffin et al. |
| 2009/0041041 A1 | 2/2009 | True et al. |
| 2009/0058682 A1 | 3/2009 | True |
| 2009/0077626 A1 | 3/2009 | Leclercq et al. |
| 2009/0103452 A1 | 4/2009 | Horvath |
| 2009/0103473 A1 | 4/2009 | Foster |
| 2009/0197595 A1 | 8/2009 | Kauffman et al. |
| 2009/0318137 A1 | 12/2009 | Kauffman et al. |
| 2009/0318138 A1 | 12/2009 | Zeng et al. |

FOREIGN PATENT DOCUMENTS

| | | |
|---|---|---|
| WO | 2005069545 | 7/2005 |
| WO | 2007022353 | 2/2007 |
| WO | 2007043827 | 4/2007 |
| WO | 2007054410 | 5/2007 |
| WO | 2007059560 | 5/2007 |
| WO | 2008007861 | 1/2008 |

OTHER PUBLICATIONS

Polajnar et al., "Simple and Efficient Protocols for Guaranteed Message Delivery in Wireless Ad-hoc Networks", "Wireless and Mobile Computing, Networking and Communications 2005", Aug. 22, 2005, pp. 93-100, vol. 3, Publisher: IEEE, Published in: Piscataway, NJ.

Sakhaee et al., "Aeronautical ad hoc Networks", "Wireless Communications and Networking Conference", Jan. 1, 2006, pp. 246-251, Publisher: IEEE, Published in: Piscataway, NJ.

Zhou et al., "GeoLANMAR: Geo Assisted Landmark Routing for Scalable, Group Motion Wireless Ad Hoc Networks", "Vehicular Technology Conference 2005", May 30, 2005, pp. 2420-2424, vol. 4, Publisher: IEEE, Published in: Piscataway, NJ.

The ATN SARPs, subvolume 8, 3rd edition, ICAO DOC 9705/AN956, Nov. 2001.

Avionica, "Securelink", , pp. 1-2, Publisher: Avionica, Sep. 5, 2007.

Carlos Jodar et al., "Wi-Fi Gatelink Trial Frankfurt and Muich, Germany White Paper", Aug. 9, 2006, pp. 1-18, Publisher: Arinc Proprietary.

Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.

Hardy et al., "Aircraft Network and File Server—ARINC 763", Oct. 16, 2002, pp. 1-12, Publisher: AEEC (Airlines Electronic Engineering Committee).

"Technical Overview for Mark III Communications Management Unit (CMU)", , pp. 1-59, Publisher: Honeywell Aerospace Electronic Systems, Jul. 23, 2002.

Hurlburt et al., "A Data Communications Concept for a Sats Scenario", "4th Integrated CNS Technologies Conference and Workshop", Apr. 2004, pp. 1-20.

Cordeiro et al., "IEEE 802.22: An Introduction to the First Wireless Standard Based on Congitive Radios", "Journal of Communications", Apr. 2006, pp. 38-47, vol. 1, No. 1, Publisher: Academy Publisher.

IVANCIC, "Modular, Cost-Effective, Extensible Avionics Architecture for Secure Mobile Communications", "2006 IEEE Aerospace Conference—Mar. 4-11, 2006 Big Sky, Montana", 2006, pp. 1-9, Publisher: IEEE.

Teledyne Technologies Inc., "Wireless Groundlink System (WGL)", "www.teledyne-controls.com/productsolution.wirelessgroundlink.groundlink.asp", 2007, pp. 1-2, Publisher: Teledyne Technologies Inc.

Teledyne Technologies Inc., "New Release", "www.teledyne-controls.com/newscenter/sco.asp", 2007, pp. 1-2, Publisher: Teledyne Technologies Inc.

"The ATN SARPs Third Edition", "Manual of Technical Provisions for the Aeronautical Telecommunications Network—ICAO Doc 9705/AN956", , Publisher: ATN, Nov. 2001.

* cited by examiner

Fig. 4

SYSTEM AND METHOD FOR TRANSMITTING INFORMATION USING AIRCRAFT AS TRANSMISSION RELAYS

BACKGROUND

Typically aircraft communicate directly from the aircraft to a ground station. Due to limits of aircraft communication ranges, an aircraft typically has to be within approximately 100-150 miles of a very high frequency (VHF) ground station to communicate. So to communicate during a flight of any significant distance, a large number of ground stations are needed. Companies which set up the ground stations then charge airlines a fee for use of the ground stations and ground communications networks to communicate data to the intended destination. As a result, airlines have an added cost to operations in order to communicate between aircraft and a ground destination not within range of a given aircraft.

Alternative methods of aircraft communication have been developed, such as through the use of high frequency (HF) and satellite communication systems. Such systems are particularly useful for areas where VHF ground stations are not available, such as over an ocean. However, such HF and satellite systems can also result in a large cost to the airlines due to the expense of launching and maintaining satellites and operating ground stations and networks. In addition, HF systems are subject to interference and disturbance due to solar activity.

SUMMARY

In one embodiment a method of processing messages in a relay network is provided. The method comprises determining if a destination node is within range; if the destination node is not in range, identifying one or more network member aircraft within range; selecting one of the one or more network member aircraft within range; authenticating membership of the selected network member aircraft if membership of the selected network member aircraft has not been previously authenticated; and transmitting the message to the selected network member aircraft in order to relay the message to the destination node at least in part via the selected network member aircraft.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the method presented in the drawing figures or the specification is not to be construed as limiting the order in which the individual steps may be performed. The following detailed description is, therefore, not to be taken in a limiting sense.

Embodiments of the present invention help reduce airline costs due to air-to-ground communications network fees as well as provide reliable communication links which avoid the costs of HF and satellite communication. In particular, embodiments of the present invention enable communication of messages by only using network member aircraft as relays to a desired destination. By only using network member aircraft, as opposed to any aircraft, embodiments of the present invention enable greater control of airline data as it is relayed via network member aircraft to its destination. The control is particularly important because airlines need a high level of assurance that the aircraft in the relay network will indeed forward the message to the destination.

Figure 1:
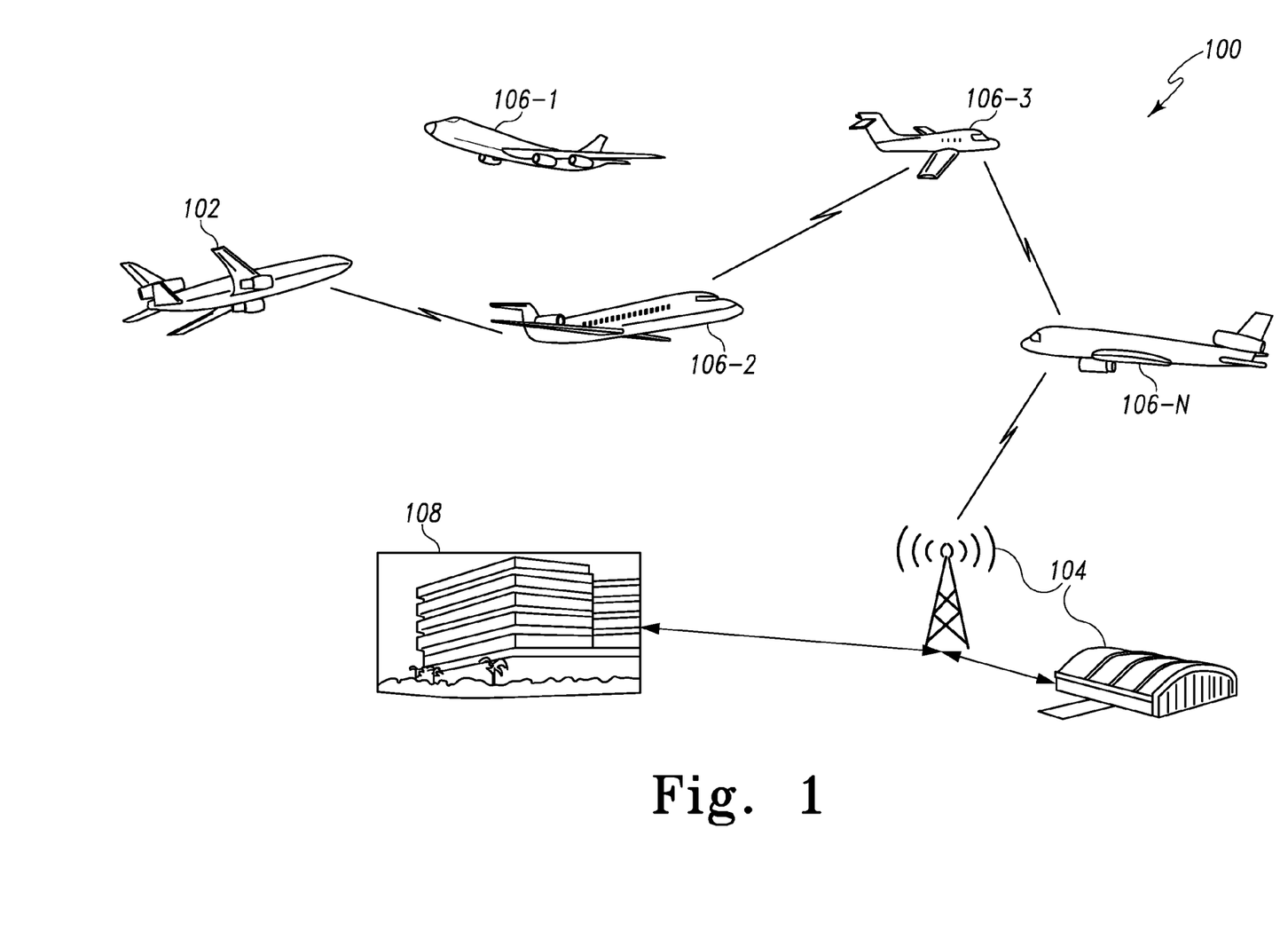
FIG. 1 is a diagram depicting a communication system using aircraft as transmission relays according to one embodiment of the present invention.

FIG. 1 is a diagram depicting an air-to-air relay network 100 using aircraft as transmission relays according to one embodiment of the present invention. Network 100 includes a sending node 102, a destination node 104, and aircraft 106-1 . . . 106-N. Notably, although four aircraft 106-1 . . . 106-N are shown in FIG. 1, it is to be understood that any appropriate number of aircraft can be used in embodiments of the present invention. Sending node 102 in this example is also an aircraft and destination node 104 is a ground destination. However, it is to be understood that in other embodiments, sending node 102 and destination node 104 are not to be so limited. In particular, in other embodiments, sending node 102 can be a ground destination (e.g. airline operations centers or air navigation service providers) and destination node 104 can be an aircraft.

Sending node 102 and aircraft 106-1 . . . 106-N each have a limited range of transmission (e.g. limited to line of sight communications, or limited by transmitter power and receiver sensitivity). For example, in this embodiment, aircraft 106-1 and 106-2 both lie within range of sending node 102. However, aircraft 106-3, 106-N and destination node 104 do not lie within the transmission range of sending node 102. A message from sending node 102, therefore, is transmitted via one or more of aircraft 106-1 . . . 106-N to destination node 104. Messages, however, are not transmitted to any of aircraft 106-1 . . . 106-N which are not network members of the same network as sending node 102 and destination node 104. For example, a network can be made of aircraft belonging to the same airline (e.g. Delta airlines), aircraft belonging to airlines in a code share agreement (e.g. SkyTeam Alliance which includes Delta, Northwest, KLM, Continental, and others), aircraft belonging to airlines which have agreed to relay each other's messages (e.g. a contract to relay messages such as for a fee or reciprocal service), or any other selective agreement.

By only relaying messages via network member aircraft, an airline is able to achieve a higher level of delivery assurance. For example, an aircraft of a competitive airline may not have any incentive to forward a message for the originating aircraft. Therefore, airlines need to control who accepts the information in relayed messages. Embodiments of the present invention enable airlines to have more control by only permitting relay of messages via authenticated network member aircraft.

In operation, sending node 102 determines which aircraft within its transmission range are members of the same network as sending node 102. For example, this can be accomplished by exchanging cryptographically strong identification credentials. In this example, aircraft 106-1 is not a network member, whereas aircraft 106-2 is a network member. As a result, aircraft 106-1 is unable to provide proper identification to sending node 102, whereas aircraft 106-2 is able to provide such identification. Since aircraft 106-1 is not a network member, sending node 102 does not set up a communication session with aircraft 106-1.

Instead, sending node 102 establishes a secure communication session with aircraft 106-2 since aircraft 106-2 is a network member. Sending node 102 and aircraft 106-2 can exchange cryptographically strong identification credentials in various situations. For example, sending node 102 may have previously received an authenticating message transmitted by aircraft 106-2 within communications range. Aircraft 106-2 may have had a number of reasons for transmitting the authentication message, for example, but not limited to, the scenario where (1) sending aircraft 102 had previously authenticated aircraft 106-2 because of a prior message transmission or (2) a different (third) aircraft, such as 106-3, may have requested authentication information and sending node 102 was also able to receive the credentials.

If sending node 102 does not currently have an active list of authenticated aircraft within communications range, sending node 102 sends a digitally signed session initialization request to any network member aircraft within communications range, in this case aircraft 106-2. Sending node 102 and aircraft 106-2 then go through a series of "hand-shake" messages to establish the secure communication session as known to one of skill in the art. In particular, in this example, sending node 102 and aircraft 106-2 use public/private key pairs to establish the session and generate a shared session key which is used for secure exchange of data during the communication session.

In addition, in some embodiments, sending node 102 selects aircraft 106-2 based on navigation data obtained regarding aircraft 106-2. For example, if more than one network member aircraft is in range of sending node 102, sending node 102 selects from the more than one network member aircraft based on navigation data regarding each of the network member aircraft. In this way, sending node 102 is able to more efficiently utilize network member aircraft for relaying messages. For example, by using navigation data, sending node 102 is able to select an aircraft which is traveling towards rather than away from destination node 104. Additionally, navigation data can be used to select network member aircraft based on the shortest path to destination node 104, the fewest relays to destination node 104, etc. If two or more network member aircraft in range are traveling in parallel courses, sending node 102, in some embodiments, randomly selects one of the network member aircraft or utilizes network congestion information to determine the best path. Alternatively, sending node 102 can transmit the message to more than one network member aircraft to transmit the message along redundant communication paths.

Once the secure communication session is established between sending node 102 and aircraft 106-2, sending node 102 begins transmitting data to aircraft 106-2. In addition to the secure communication session, sending node 102 also separately applies information security, such as encryption, to data transmitted to aircraft 106-2 in some embodiments. In such embodiments, aircraft 106-2 is able to receive the correct data but is unable to read the data unless provided with the proper key or password to decrypt the message. Since aircraft 106-2 is also not within range of destination node 104, in this example, aircraft 106-2 repeats the process described above to establish a secure communication session with fellow network member aircraft 106-3 and relay the data from sending node 102 to aircraft 106-3.

Aircraft 106-3, in turn, repeats the process described above to establish a secure communication session with network member aircraft 106-N and relay the data to aircraft 106-N. Aircraft 106-N is in range of destination node 104. Once aircraft 106-N verifies the identity of destination node 104 using cryptographically strong credentials, aircraft 106-N relays the data from sending node 102 to destination node 104. Alternatively, in some embodiments, sending node 102 does not begin transmitting data to aircraft 106-2 until a secure communication path has been established from sending node 102 to destination node 104 via network member aircraft, 106-2 . . . 106-N. In addition, in some embodiments, sending node 102 applies information security so that only the destination node 104 can perform one or more information security functions on the message, such as decryption, verification of the sender identity, and validation of the message integrity.

In this embodiment, destination node 104 is a ground destination which represents one of potentially multiple destinations nodes with which aircraft node 102 may desire to communicate. In another embodiment, aircraft 106-N may be on the ground and in communications with destination node 104 via any number of terminal area communications links, which differ from the air-to-air links used between aircraft in flight. These terminal area communications links are known to those skilled in the art.

Coupled to destination node 104 is network operations center 108. Network operations center 108 uses statistical data received at destination node 104 to manage relay network 100. Network management performed by network operations center 108 includes, but is not limited to, one or more of fault management, performance management, security management, configuration management, and accounting management. Fault management involves detecting and correcting faults in relay network 100. For example, network operations center 108 can be configured to analyze statistical data to determine if a number of aircraft or ground destinations have been unable to establish a communication session with a particular network member aircraft. Once a problem network aircraft lands, it can then be serviced to correct the communication problem.

Performance management includes analyzing the efficiency of relay network 100 to improve the network and/or correct problems which affect its efficiency. Security management includes, but is not limited to, managing authorized public and private keys for authorized network member aircraft. Configuration management includes, but is not limited to, analyzing data received regarding network member aircraft to ensure that all aircraft have the correct software and hardware installed for operation of relay network 100. Accounting management can be used to collect data regarding how much data has been relayed for different airlines. For example, an airline, such as Southwest, may have an agreement to relay data for another airline, such as Northwest, for an agreed upon fee. The fee can be based on the amount of data relayed, the number of Southwest aircraft relaying data for Northwest, etc. Network operations center 108 is configured, in such embodiments, to determine the appropriate fees based on the data relayed for another airline.

Hence, embodiments of the present invention not only enable air-to-air relay of data but also increase security and control over who has access to and accepts the relayed data by selectively using aircraft as relays based on whether or not the aircraft are members of an allowed network. Embodiments of the present invention also enable management of relay network 100 to improve and support operation of the relay network.

Figure 2:
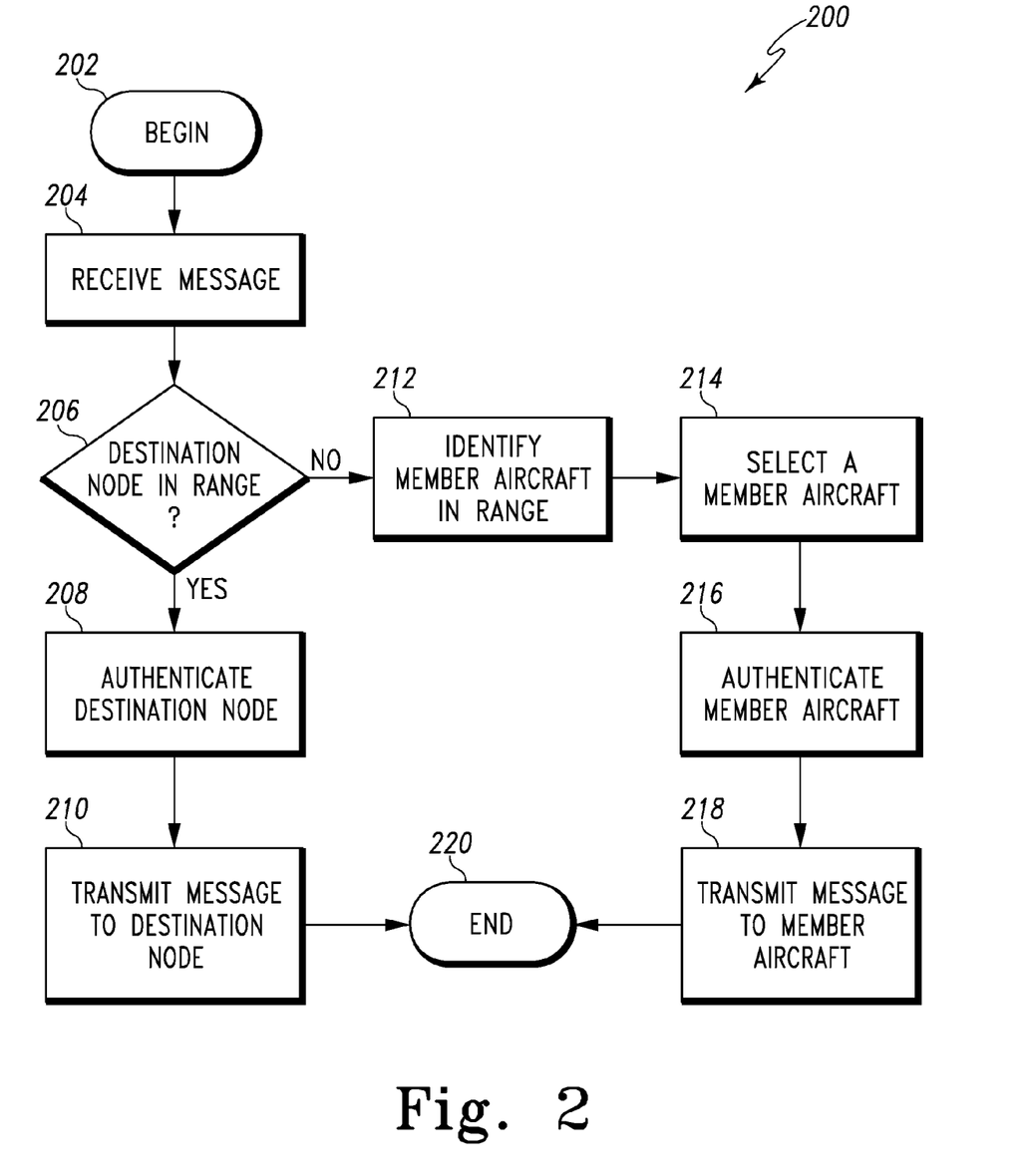
FIG. 2 is a flow chart showing a method of processing messages in a network using aircraft as transmission relays according to one embodiment of the present invention.

FIG. 2 is a flow chart showing a method 200 of processing messages in a network using aircraft as transmission relays according to one embodiment of the present invention. Method 200 is used to process messages in relay aircraft (e.g. aircraft 106-2) and sending nodes (e.g. sending node 102) in a network such as relay network 100. At 204, a message is received at a relay aircraft or a sending node. Messages are received in a processing unit (e.g. processing unit 402 in FIG. 4) of a sending node from other components such as from data sensors or aircraft systems (e.g. sensors and systems 406 in FIG. 4). In a relay aircraft, messages are received over a communication link with a sending node or another relay aircraft. For purposes of explanation, the message is received in a sending node in this example. However, it is to be understood that the process described similarly applies to relay aircraft.

At 206, it is determined if a destination node (e.g. destination node 104) is within range of the sending node. If the destination node is within range, the network membership of the destination node is authenticated at 208. Authentication includes verifying the identity of the destination node based on cryptographically strong credentials received from the destination node. In addition, membership authentication includes establishing a secure communication session with the destination node through techniques known to one of skill in the art. At 210, after authenticating the destination node, the message is transmitted to the destination node. In addition, transmitting the message includes, in some embodiments, applying information security to the message such that only the destination node is able to properly receive, decrypt, verify the identity of the sending node, and/or validate the integrity of the message. Information security can include, but is not limited to, encryption and/or authentication of the message prior to transmission using session keys, as is known to one of skill in the art.

If the destination node is not within range at 206, the sending node identifies network member aircraft that are in range at 212. For example, in some embodiments, network membership aircraft are identified by determining which aircraft belong to an airline that is a member of a relay service contract or a codeshare agreement with the sending node. In some embodiments, network member aircraft in range are identified by receiving messages of opportunity that were transmitted by other network member aircraft within range of the sending node 102 for any one of a number of reasons, such as discussed above. In another embodiment network member aircraft are identified by automatic dependent surveillance broadcasts (ADS-B) from each aircraft in range. The ADS-B signals include information which is used to identify each aircraft. In other embodiments, network member aircraft in range are identified using other techniques. For example, in some embodiments, the sending node transmits a request to all aircraft in range requesting each aircraft to respond with identification information.

At 214, at least one of the network member aircraft in range is selected. In some embodiments, selection of a network member aircraft is based on a hierarchy of network aircraft. For example, in some embodiments, network aircraft belonging to the same airline as the sending node are selected first. If no aircraft belonging to the same airline as the sending node are in range, a network member aircraft belonging to a different airline is selected. In other embodiments, selection of the network member aircraft is based, at least in part, on navigation data for each network member aircraft in range of the sending node. For example, an aircraft traveling toward the destination node is selected in lieu of a network member aircraft traveling away from the destination node. Additionally, navigation data can be used to select network member aircraft based on the shortest path to the destination node, the fewest relays to the destination node, etc. In addition, in other embodiments, selection is based upon signal strength or signal strength trends, e.g. getting stronger, staying constant, or getting weaker. In other embodiments, selection is based on a weighted combination of the aforementioned criteria.

If two or more network member aircraft in range are traveling in parallel courses, one of the network member aircraft is selected randomly, in some embodiments. Alternatively, the message can be transmitted to more than one network member aircraft in range to transmit the message along redundant communication paths. In addition, in other embodiments, selection of the network member aircraft is based, at least in part, on the characteristics of the message being transmitted and network policies. For example, according to network policies, certain confidential messages can only be relayed via aircraft belonging to the same airline as the sending node. In other embodiments, selection of the network member aircraft is based upon network congestion status along various paths through the network.

At 216, network membership of the selected network member aircraft is authenticated if the sending node has not previously authenticated the selected network member aircraft. Authentication includes verifying the identity of the selected network member aircraft based on cryptographically strong credentials received from the selected network member aircraft. In addition, membership authentication includes establishing a secure communication session with the selected network member aircraft through techniques known to one of skill in the art. Additionally, in some situations, the sending node has already received authentication credentials of opportunity that were transmitted by the selected network member aircraft for reasons other than a request from the sending node. In addition, it is to be understood, that if authentication of the selected network member aircraft fails, method 200 returns to 214 where another network member aircraft is selected.

At 218, the message is transmitted from the sending node to the selected network member aircraft. In addition, transmitting the message includes, in some embodiments, applying information security to the message, such as encryption and/or authentication of the message using a session key, such that only the selected network member aircraft is able to properly receive, decrypt, verify the identity of the sending node, and/or validate the integrity of the message. In some such embodiments, the selected network member aircraft is able to receive and relay the correct message but is unable to read the data in the message. For example, if the selected network member aircraft is from a different airline than that of the sending node, the sending node can apply information security to the message, such that only the destination node is able to properly receive, decrypt, verify the identity of the sending node, and/or validate the integrity of the message even though the selected network member aircraft is able to receive and relay the message.

In addition, in some embodiments, relay network statistics are also transmitted in addition to the message from the sending node. Transmitting relay network statistics allows a network operations center (e.g. network operation center 108) to monitor various aspects of the relay network. For example, the network relay statistics can include, but is not limited to, data regarding network performance, network faults, network security, network configuration, and network accounting. As described above, network performance relates to management of the network efficiency. Security management relates to managing authorized public and private keys and network policies. Network configuration relates to data indicating if all network member aircraft have the proper hardware and/or software installed for operation of the network. Network accounting data is used, for example, in embodiments in which an airline charges a fee for acting as a relay. In such embodiments, accounting data is used to generate fees for other airlines which have relayed data using the airline's aircraft. Network fault data relates to detecting errors and faults in the relay network. For example, when a particular aircraft is unable to communicate and act as a relay even though network policies indicate that the aircraft should be authorized. Network fault data indicates such errors or problems in the relay network.

The method then ends at 220. The network member aircraft selected at 214 which acts as a relay for the message will then perform a similar method to determine if the destination node is in range. If the destination node is not in range, the network member aircraft transmits the message to another network member aircraft which in turn performs the same method. The message is therefore relayed between network member aircraft until one of the network member aircraft is in range of the destination node and transmits the message to the destination node. It should be noted that method 200 enables inherent updating of the communication path between the sending node and the destination node. In particular, as each network member aircraft receives the message, it checks for other network member aircraft in range and authenticates one of the other network member aircraft. Hence, even if a network aircraft member previously used as a relay is no longer in range, this change will be detected as network member aircraft in range are identified at 212. Alternatively, each network member aircraft stores information regarding the network member aircraft selected at 214. The network member aircraft at 212 is then used in subsequent communications unless it has moved out of range. It should be noted, that in another embodiment, the destination node can also transmit a message to the sending node via a similar method. It is not necessary for the destination node to have received a message from the sending node prior to originating a message to the sending node.

Figure 3:
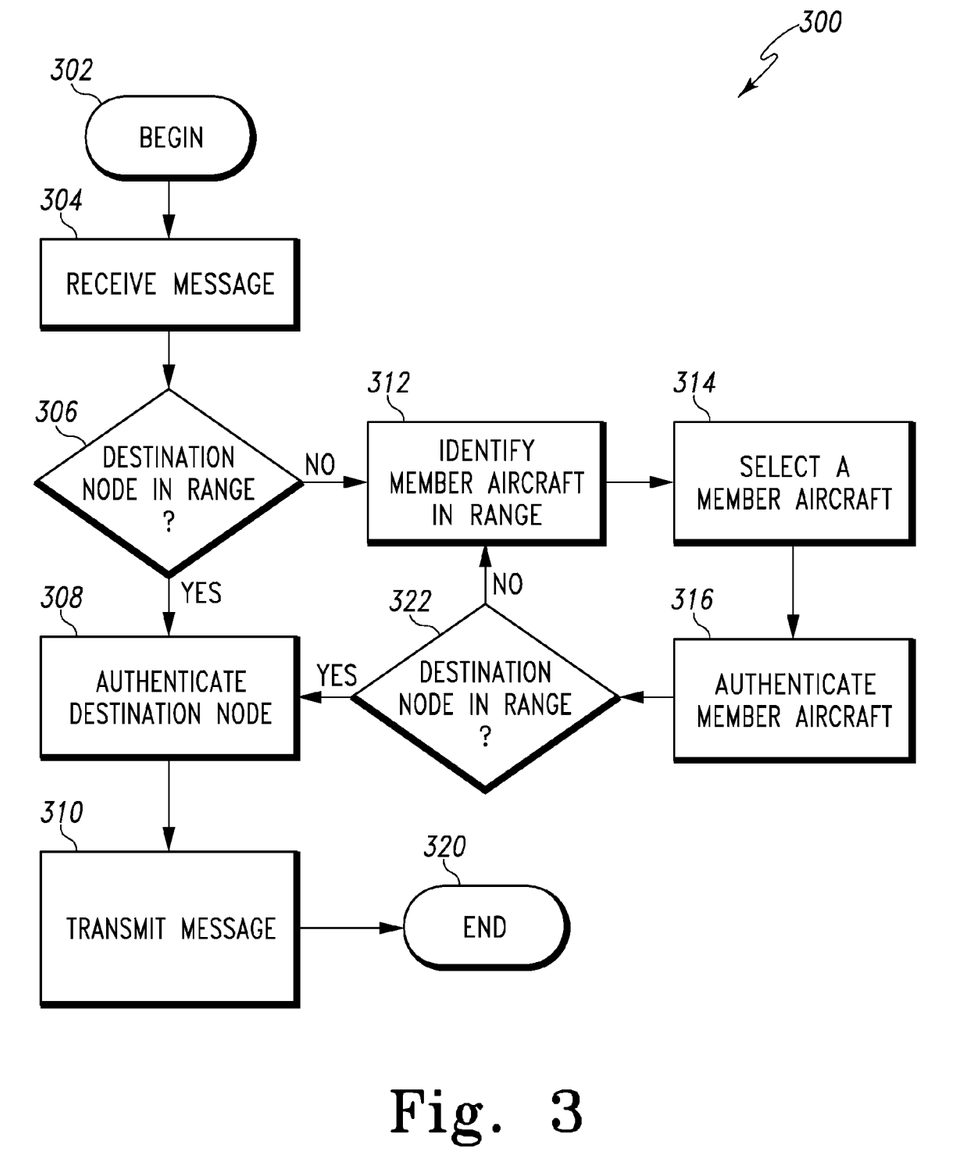
FIG. 3 is a flow chart showing an alternate method of processing messages in a network using aircraft as transmission relays according to one embodiment of the present invention

FIG. 3 is a flow chart showing an alternate method 300 of processing messages in a network using aircraft as transmission relays according to one embodiment of the present invention. Method 300 is used to process messages in relay aircraft (e.g. aircraft 106-2) and sending nodes (e.g. sending node 102) in a network such as relay network 100. At 304, a message is received at a sending node. Messages are received in a processing unit (e.g. processing unit 402 in FIG. 4) of the sending node from other components such as from data sensors or aircraft systems (e.g. sensors and systems 406 in FIG. 4). At 306, it is determined if a destination node (e.g. destination node 104) is within range of the sending node. If the destination node is within range, the network membership of the destination node is authenticated at 308.

Authentication includes verifying the identity of the destination node based on cryptographically strong credentials received from the destination node. In addition, membership authentication includes establishing a secure communication session with the destination node through techniques known to one of skill in the art. At 310, after authenticating the destination node, the message is transmitted to the destination node. In addition, transmitting the message includes, in some embodiments, applying information security to the message, such as encryption and/or authentication of the message session keys, such that only the selected network member aircraft is able to properly receive, decrypt, verify the identity of the sending node, and/or validate the integrity of the message.

If the destination node is not within range at 306, the sending node identifies network member aircraft that are in range at 312. For example, in some embodiments, network membership aircraft are identified by determining which aircraft belong to an airline that is a member of a relay service contract or a codeshare agreement with the sending node. In some embodiments, network member aircraft in range are identified by receiving messages of opportunity that were transmitted by other network member aircraft within range of the sending node 102 for any one of a number of reasons. In another embodiment network member aircraft are identified by automatic dependent surveillance broadcasts (ADS-B) from each aircraft in range. The ADS-B signals include information which is used to identify each aircraft. In other embodiments, network member aircraft in range are identified using other techniques. For example, in some embodiments, the sending node transmits a request to all aircraft in range requesting each aircraft to respond with identification information.

At 314, at least one of the network member aircraft in range of the sending node is selected. In some embodiments, selection of a network member aircraft is based on a hierarchy of network aircraft. For example, in some embodiments, network aircraft belonging to the same airline as the sending node are selected first. If no aircraft belonging to the same airline as the sending node are in range, a network member aircraft belonging to a different airline is selected. In other embodiments, selection of the network member aircraft is based, at least in part, on navigation data for each network member aircraft in range of the sending node. For example, an aircraft traveling toward the destination node is selected in lieu of a network member aircraft traveling away from the destination node. Additionally, navigation data can be used to select network member aircraft based on the shortest path to the destination node, the fewest relays to the destination node, etc. In other embodiments, selection is based upon signal strength or signal strength trends, e.g. getting stronger, staying constant, or getting weaker. In other embodiments, selection is based on a weighted combination of the aforementioned criteria.

If two or more network member aircraft in range are traveling in parallel courses, in some embodiments, one of the network member aircraft is selected randomly. Alternatively, the message can be transmitted to more than one network member aircraft in range to transmit the message along redundant communication paths. In addition, in other embodiments, selection of the network member aircraft is based, at least in part, on the characteristics of the message being transmitted and network policies. For example, according to network policies, certain confidential messages can only be relayed via aircraft belonging to the same airline as the sending node. In other embodiments, selection of the network member aircraft is based upon network congestion status along various paths through the network.

At 316, network membership of the selected network member aircraft is authenticated if the sending node has not previously authenticated the selected network member aircraft. Authentication includes verifying the identity of the selected network member aircraft based on cryptographically strong credentials received from the selected network member aircraft. In addition, membership authentication includes establishing a secure communication session with the selected network member aircraft through techniques known to one of skill in the art. Additionally, in some situations, the sending node has already received authentication credentials of opportunity that were transmitted by the selected network member aircraft for reasons other than a request from the sending node. In addition, it is to be understood, that if authentication of the selected network member aircraft fails, method 300 returns to 314 where another network member aircraft is selected.

At 322, the selected network member aircraft determines if the destination node is in range of the selected network member aircraft. If the destination node is in range of the selected network member aircraft, the network membership of the destination node is authenticated at 308. The message is then transmitted from the sending node to the destination node via the selected network member aircraft at 310. If the destination node is not within range of the selected network member aircraft, network member aircraft within range of the selected network member aircraft are identified at 312.

At 314, one of the network member aircraft in range of the first selected network member aircraft (i.e. the network member aircraft in range of the sending node) is selected. In other words, a second network member aircraft is selected. The network membership of the second selected network member aircraft is authenticated at 316. At 322, the second network member aircraft determines if the destination node is in range. If the destination node is not in range of the second selected network member aircraft, method 300 repeats the loop of blocks 312, 314, 316, and 322 until the destination node is in range of a selected network member aircraft. In other words, the loop of blocks 312, 314, 316, and 322 establishes a communication path from the sending node to the destination node via one or more network member aircraft. Once the communication path is established (i.e. the destination node is within range of one of the selected network member aircraft), the network membership of the destination node is authenticated at 308. The message is then transmitted from the sending node to the destination node via the selected network member aircraft at 310. That is, the sending node does not transmit the message until the communication path is established.

In addition, transmitting the message at 310 includes, in some embodiments, applying information security to the message, such as encryption and/or authentication of the message using a session key, such that only the selected network member aircraft is able to properly receive, decrypt, verify the identity of the sending node, and/or validate the integrity of the message. In some such embodiments, each of the selected network member aircraft is able to receive and relay the correct message but is unable to read the data in the message. For example, if the selected network member aircraft is from a different airline than that of the sending node, the sending node can apply information security to the message, such as encryption and/or authentication of the message, such that only the destination node is able to properly receive, decrypt, verify the identify of the sending node, and/or validate the integrity of the message even though the selected network member aircraft is able to receive and relay the message.

In addition, in some embodiments, relay network statistics are also transmitted in addition to the message from the sending node. Transmitting relay network statistics allows a network operations center (e.g. network operation center 108) to monitor various aspects of the relay network. For example, the network relay statistics can include, but is not limited to, data regarding network performance, network faults, network security, network configuration, and network accounting. As described above, network performance relates to management of the network efficiency. Security management relates to managing authorized public and private keys and network policies. Network configuration relates to data indicating if all network member aircraft have the proper hardware and/or software installed for operation of the network. Network accounting data is used, for example, in embodiments in which an airline charges a fee for acting as a relay. In such embodiments, accounting data is used to generate fees for other airlines which have relayed data using the airline's aircraft. Network fault data relates to detecting errors and faults in the relay network. For example, when a particular aircraft is unable to communicate and act as a relay even though network policies indicate that the aircraft should be authorized. Network fault data indicates such errors or problems in the relay network.

The method then ends at 320. It should be noted that the established communication path is updated as network member aircraft change position in relation to each other and the sending and destination nodes. For example, if one of the selected network member aircraft travels out of range of other selected network member aircraft in the communication path, the selected network member aircraft that is not longer in range is replaced by another network member aircraft. Alternatively, if one of the selected network member aircraft travels out of range, method 300 repeats to establish a new communication path. It should be noted, that in another embodiment, the destination node can also transmit a message to the sending node via a similar method. It is not necessary for the destination node to have received a message from the sending node prior to originating a message to the sending node.

Figure 4:
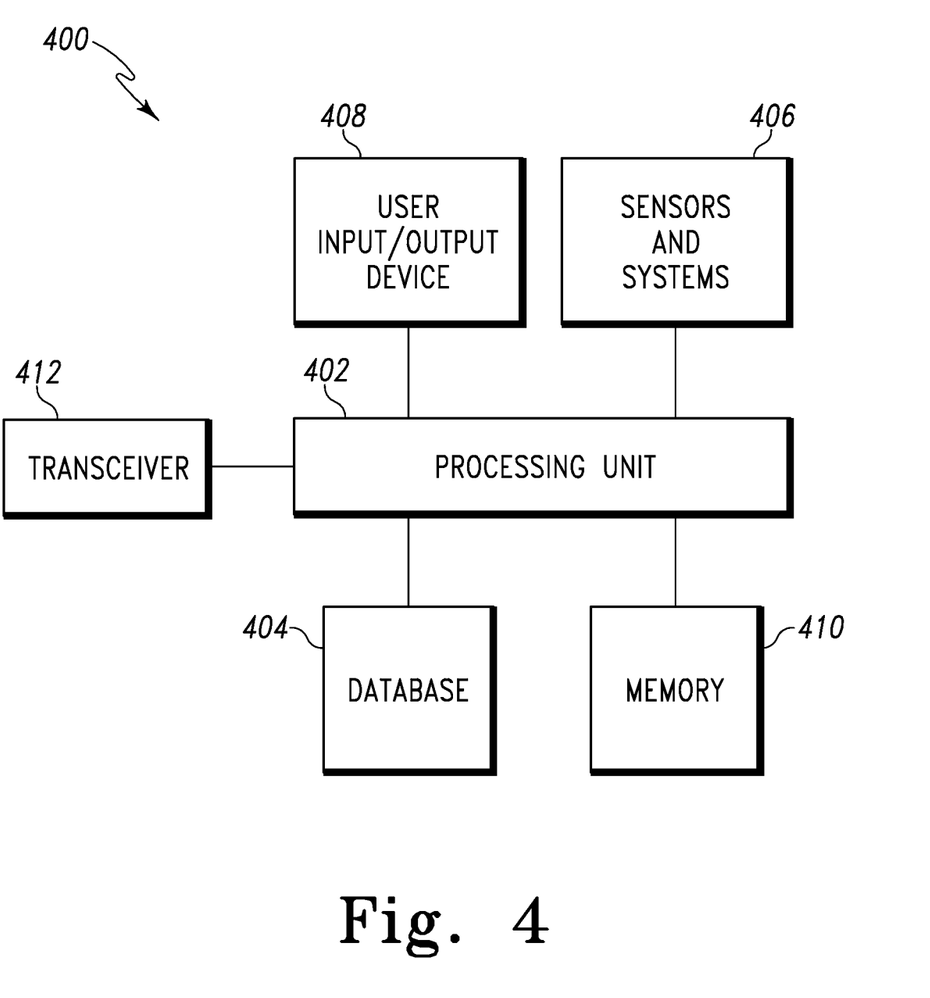
FIG. 4 is a block diagram of an aircraft communication device according to one embodiment of the present invention.

FIG. 4 is a block diagram of an aircraft communication device 400 according to one embodiment of the present invention. Communication device 400 is used in aircraft in a relay network such as network 100 described above. In addition, communication device 400 is used to implement methods of relaying data such as methods 200 and 300 described above. Communication device 400 includes processing unit 402, database 404, one or more sensors and/or systems 406, user input/output device 408, memory 410, and transceiver 412. It is to be understood that although a transceiver is used in this embodiment, a separate transmitter and receiver can be used in other embodiments of the present invention. It is also to be understood that, in some embodiments, an aircraft may have more than one type of transceiver or separate transmitters and receivers. In some embodiments, an aircraft receives a relayed message via one transceiver or receiver and relays the message to another aircraft or destination node through a different transceiver or transmitter.

Sensors and systems 406 are configured to provide data to processing unit 406 for transmission to a destination node (e.g. destination node 104). Sensors and systems 406 include, but are not limited to, flight management systems, fuel consumption sensors, etc. For example, sensors and systems 406 provide data including, but not limited to, fuel consumption, fuel efficiency, passenger count, and flight status (e.g. expected delay, on time, etc.). Similarly, user input/output device 408 is configured to provide data from a user, such as a pilot, to processing unit 402 for transmission to a destination node or to display received data that is transmitted from the destination node to processing unit 402 in the sending node.

Processing unit 402 includes or interfaces with hardware components that support the graphics display system. By way of example and not by way of limitation, these hardware components include one or more microprocessors, graphics processors, memories, storage devices, interface cards, and other standard components known in the art. Additionally, processing unit 402 includes or functions with software programs, firmware or computer readable instructions for carrying out various methods, process tasks, calculations, and control functions, used in the operation of the relay network, such as method 200 or method 300 described above. These instructions are typically stored on any appropriate medium used for storage of computer readable instructions such as floppy disks, conventional hard disks, CD-ROM, flash ROM, non-volatile ROM, RAM, and other like medium.

Similarly, memory 410 and database 404 include any appropriate medium for storage of data from sensors or systems 406 and user input/output device 408. Such media include, but are not limited to, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

When processing unit 402 receives data to transmit, it temporarily stores the data in memory 410 while a secure communication session is established. The data can be received from sensors or systems 408 or user input/output device 406. In addition, the data can be received from a communication device in another aircraft. In which case processing unit 402 processes the data in order to relay the data to another network member aircraft or to the destination node. If the destination node is not within the transmission range of transceiver 412, processing unit 402 determines which network member aircraft to use as a relay. In particular, processing unit 402 selects a network member aircraft to establish a secure communication session as described above.

For example, in one embodiment, processing unit 402 uses a private key stored in database 404 to digitally sign a session initialization request. The session initialization request is transmitted by transceiver 412 to aircraft within range of transceiver 412. A network member aircraft within range will be able to receive and validate the session initialization request using the public key associated with the private key used in generating the session initialization request. In some embodiments, processing unit 402 selects from among more than one network member aircraft in range based on navigation data for each network member aircraft in range. In other embodiments, selection is based upon signal strength or signal strength trends, e.g. getting stronger, staying constant, or getting weaker. In other embodiments, selection is based on a weighted combination of the aforementioned criteria.

In responding to the session initialization request, the selected network member aircraft transmits cryptographically strong identification credentials to transceiver 412. Processing unit 402 uses the identification credentials to verify the identity of the selected network member aircraft. In particular, processing unit 402 compares the identification credentials to data in database 404. Database 404 is configured to store identification credentials, including the private key for the sending node and public keys of authorized network member aircraft and the network cryptographic certification authority, as well as policies which dictate which aircraft are authorized for use as relays.

For example, in some embodiments, policies stored in database 404 indicate which airlines are network members. In addition, in some embodiments, policies stored in database 404 indicate which message types can be relayed by certain airlines in the network or what types of information security to apply to each type of message. For example, in some embodiments, policies in database 404 categorize message types according to its business sensitivity (e.g. confidential, highly confidential, high priority, or low priority, etc.). Policies in database 404 indicate which network member airlines are authorized to relay which categories of data. In other embodiments, policies in database 404 also indicate if information security is to be applied to the message so that only the destination node or also other aircraft relays are authorized to decrypt the message. Policies in database 404 can also indicate if the message is to be sent with authentication credentials so that the identity of the sender can be verified and the integrity of the message can be validated by the destination node or also other relay aircraft.

A processing unit in the selected network member aircraft and processing unit 402 proceed through a series of "handshakes" to establish a secure communication session using techniques known to one of skill in the art. In this embodiment, the selected network member aircraft either establishes a secure communication session with the destination node or with another network member aircraft. Once a communication path has been established to the destination node, processing unit 402 processes the data stored in memory 410 and delivers the processed data to transceiver 412 for transmitting to the selected network member aircraft. In some embodiments, processing the data includes applying information security to the data, such as at encryption and/or authentication of the data in addition to other processing necessary for the secure communication session. The processed data is then relayed to the destination node via the selected network member aircraft.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of processing a message in a relay network, the method comprising:
 determining when a destination node is within range of transmission of a sending node;
 when the destination is in range, transmitting the message to the destination node after authenticating network membership of the destination node, wherein authenticating network membership of the destination node includes verifying the identity of the destination node based on cryptographic credentials received from the destination node;
 when the destination node is not in range, identifying one or more network member aircraft within range of transmission of the sending node, wherein a network member aircraft is an aircraft whose airline has agreed to relay messages from the sending node, the one or more network member aircraft being a subset of aircraft within range that are capable of relaying messages;

selecting one of the one or more network member aircraft within range;

authenticating membership of the selected network member aircraft if membership of the selected network member aircraft has not been previously authenticated, wherein authenticating membership of the selected network member aircraft is based on cryptographic credentials received from the selected network member aircraft, wherein the cryptographic credentials identify the one or more network member aircraft as belonging to the airline that has agreed to relay messages from the sending node; and transmitting the message to the selected network member aircraft in order to relay the message to the destination node at least in part via the selected network member aircraft.

2. The method of claim 1, wherein transmitting the message to the selected network member aircraft includes applying information security to the message such that only the destination node is able to perform at least one of decryption of the message, verification of the sending node's identity, and validation of the message's integrity.

3. The method of claim 1, wherein selecting one of the one or more network member aircraft includes selecting one of the one or more network member aircraft based on one or more of navigation data for each of the one or more network member aircraft, the message's characteristics and network policies, signal strength for each of the one or more network member aircraft, signal strength trends for each of the one or more network member aircraft, and network congestion status.

4. The method of claim 1, wherein transmitting the message to the selected network member aircraft includes applying information security to the message such that only the destination node and the selected network member aircraft are able to perform at least one of decryption of the message, verification of the sending node's identity, and validation of the message's integrity.

5. The method of claim 1, wherein identifying one or more network member aircraft within range comprises identifying at least one of: aircraft whose airline is a member of a contract to relay messages for a fee; aircraft belonging to the same airline as the sending node; and an aircraft whose airline is a member of a reciprocal service agreement with the airline of the sending node.

6. The method of claim 1, further comprising establishing a communication path from the sending node to the destination node prior to transmitting the message to the selected network member aircraft, wherein establishing a communication path comprises:

determining when the destination node is within range of transmission of the selected network member aircraft;

when the destination node is not within range of the selected network member aircraft, identifying one or more network member aircraft within range of the selected network member aircraft;

selecting one of the one or more network member aircraft within range of the selected network member aircraft; and repeating until a network member aircraft is within range of the destination node.

7. The method of claim 1, further comprising authenticating network membership of the destination node.

8. The method of claim 1, wherein transmitting the message to the selected network member aircraft includes transmitting network statistics.

9. A telecommunication system comprising:
a sending node;
a destination node; and
one or more network member aircraft, wherein a network member aircraft is an aircraft whose airline has agreed to relay messages from the sending node, the one or more network member aircraft being a subset of aircraft within range that are capable of relaying messages; each of the sending node, the destination node, and the one or more network member aircraft having a communication device configured to relay a message from the sending node to the destination node via the one or more network member aircraft, wherein each communication device comprises:
a database configured to store cryptographically strong credentials and network policies;
a transceiver configured to transmit and receive the message; and
a processing unit configured to authenticate membership in the network based on the stored cryptographically strong credentials and network policies prior to relay of the message, wherein the message is only relayed via the one or more network member aircraft, wherein the cryptographically strong credentials identify the one or more network member aircraft as belonging to the airline that has agreed to relay messages from the sending node.

10. The telecommunication system of claim 9, wherein the processing unit in the sending node is further configured to apply information security to the message prior to transmitting the message to one of the one or more network member aircraft such that only the destination node is able to perform at least one of decryption of the message, verification of a sending node's identity, and validation of the message's integrity.

11. The telecommunication system of claim 9, wherein the processing unit is configured to select one of the one or more network member aircraft within range of the transceiver based on at least one of navigation data for the one or more network member aircraft, the message's characteristics and network policies, signal strength for the one or more network member aircraft, signal strength trends for the one or more network member aircraft, and network congestion status.

12. The telecommunication system of claim 9, wherein network membership of the one or more network member aircraft is based on at least one of membership of an airline of the one or more network aircraft in a contract to relay messages for a fee; the one or more network aircraft belonging to the same airline as the sending node; and membership of an airline of the one or more network aircraft in a reciprocal service agreement with the airline of the sending node.

13. The telecommunication system of claim 9, wherein the processing unit in the sending node is configured to wait to transmit the message until a communication path to the destination node via the one or more network member aircraft is established.

14. The telecommunication system of claim 9, wherein the processing unit in the sending node and in the one or more network member aircraft is configured to update a communication path from the sending node to the destination node as position of the one or more network member aircraft changes.

15. The telecommunication system of claim 9, further comprising a network operations center coupled to the destination node and configured to monitor network statistics for the telecommunication system.

16. A computer program product, comprising:
a non-transitory computer-usable medium having computer-readable code embodied therein for configuring a computer processor, the non-transitory computer-usable medium comprising:
  first executable computer-readable code configured to cause a computer processor to select a network member aircraft from a plurality of aircraft, wherein a network member aircraft is an aircraft whose airline has agreed to relay messages from a sending node, the one or more network member aircraft being a subset of aircraft within range that are capable of relaying messages;
  second executable computer-readable code configured to cause a computer processor to authenticate the selected network member aircraft based on cryptographically strong credentials and network policies stored in a database coupled to the computer processor, wherein the cryptographic strong credentials identify the one or more network member aircraft as belonging to the airline that has agreed to relay messages from the sending node; and
  third executable computer-readable code configured to cause a computer processor to transmit a message via a transmitter coupled to the computer processor.

17. The computer program product of claim 16, wherein the first executable computer-readable code is further configured to cause a computer processor to select a network member aircraft from a plurality of network member aircraft within range of the transmitter based on at least one of navigation data for each of the plurality of network member aircraft, the message's characteristics and network policies, signal strength for the plurality of network member aircraft, signal strength trends for the plurality of network member aircraft, and network congestion status.

18. The computer program product of claim 16, wherein the third executable computer-readable code is further configured to cause a computer processor to apply information security to the message prior to transmission of the message to the authenticated network member aircraft such that only a destination node is able to perform at least one of decryption of the message, verification of a sending node's identity, and validation of the message's integrity.

19. The computer program product of claim 16, wherein the third executable computer-readable code is further configured to cause a computer processor to wait to transmit the message until a communication path to a destination node is established.

20. The computer program product of claim 16, wherein the first executable computer-readable code is further configured to cause a computer processor to select a network member aircraft from the plurality of aircraft based on at least one of membership of the network member aircraft's airline in a contract to relay messages for a fee; aircraft belonging to the same airline as the sending node; and membership of the network member aircraft's airline in a reciprocal service agreement with the airline of the sending node.

\* \* \* \* \*